United States Patent
Brindell et al.

[11] 3,843,599
[45] Oct. 22, 1974

[54] RUBBERS STABILIZED WITH POLYPHENYLENE ETHERS AND PROCESS THEREOF

[75] Inventors: Gordon D. Brindell, Crystal Lake; Rudolph F. Macander, Cary, both of Ill.

[73] Assignee: The Quaker Oats Company, Chicago, Ill.

[22] Filed: May 15, 1972

[21] Appl. No.: 253,288

[52] U.S. Cl. .............. 260/45.85 S, 260/45.7 S, 260/45.95 C, 260/45.95 G, 260/8.10
[51] Int. Cl. .............. C08f 45/58, C08g 51/58
[58] Field of Search....... 260/47 EP, 47 K, 45.95 G; 252/48.2, 33.6 R, 800, 876 R

[56] References Cited
UNITED STATES PATENTS

| | | | |
|---|---|---|---|
| 3,306,874 | 2/1967 | Hay | 260/47 EP |
| 3,306,875 | 2/1967 | Hay | 260/33.6 R |
| 3,383,340 | 5/1968 | MacCallum et al. | 260/3 |
| 3,383,435 | 5/1968 | Cipek | 260/874 |
| 3,487,044 | 12/1969 | Tholstrup | 260/45.85 |
| 3,630,900 | 12/1971 | Van der Voort | 252/47.5 |
| 3,663,654 | 5/1972 | Haaf | 260/876 R |
| 3,663,661 | 5/1972 | Katchman | 260/876 R |

Primary Examiner—Donald E. Czaja
Assistant Examiner—William E. Parker
Attorney, Agent, or Firm—Joseph P. O'Halloran; Grace J. Fishel

[57] ABSTRACT

Rubbers stablized with polyphenylene ethers of the following formula are disclosed:

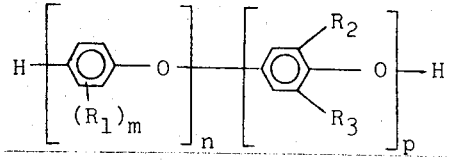

wherein $R_1$ is hydrogen, primary alkyl, or secondary alkyl; $R_2$ and $R_3$ are primary alkyl, secondary alkyl, primary aralkyl, or secondary aralkyl, $m$ is an integer between 1 and 2 inclusive; and the sum of $n + p$ is an integer between 2 and 100 inclusive with the further condition that $p$ is never 0.

15 Claims, No Drawings

RUBBERS STABILIZED WITH POLYPHENYLENE ETHERS AND PROCESS THEREOF

BACKGROUND OF THE INVENTION

1. Field of the Invention

This invention relates to novel rubber compositions with improved resistance to oxidative deterioration.

2. Description of the Prior Art

U.S. Pat. No. 3,630,900 teaches the use of linear polymers of the following general formula as high temperature stabilizers for lubricating oils:

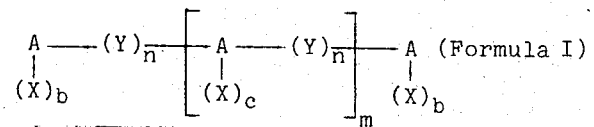

(Formula I)

wherein A represents a benzene nucleus, Y represents a metal-free bivalent radical selected from the group consisting of —O—, —NH—, —NR—, —S—, —SO—, and —SO$_2$—, wherein R is a group having from one to 60 carbon atoms and from 0 to 10 nitrogen atoms, $b$ is an integer from 2 to 5, $c$ is an integer from 2 to 4, $m$ is at least 8, $n$ is 0 to 1, and X is selected from the group consisting of $C_{1-30}$ alkyl, OH, Cl, NO$_2$, SO$_3$H, —B, —SO$_2$B and —ZB, wherein B represents an amine group having from 1 to 10 nitrogen atoms and from 0 to 60 carbon atoms, and Z represents a carbonyl hydrocarbyl group having from one to 20 carbon atoms and from 1 to 2 carbonyl radicals, at least one of which is attached to the amine group B.

We have unexpectedly found that particular linear polymers of Formula I are good antioxidants in rubbers.

SUMMARY OF THE INVENTION

The present invention may be briefly described as a rubber stabilized with a polyphenylene ether having the following structural formula:

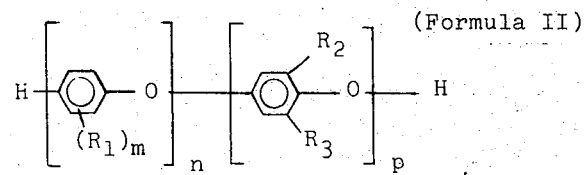

(Formula II)

wherein R$_1$ is hydrogen, primary alkyl, or secondary alkyl; R$_2$ and R$_3$ are primary alkyl, secondary alkyl, primary aralkyl, or secondary aralkyl; $m$ is an integer between 1 and 2 inclusive; and the sum of $n + p$ is an integer between 2 and 100 inclusive with the further stipulation that $p$ is never less than 1.

The present invention may further be described as a process for stabilizing rubbers which comprises incorporating with said rubber from 0.01 percent to 10 percent by weight of a polyphenylene ether of Formula II.

The antioxidants of the present invention have increased stability and decreased volatility over known stabilizers for rubbers and are, therefore, advantageous for high temperature applications.

By alkyl in Formula II we mean to include methyl, ethyl, propyl, butyl, pentyl, hexyl, heptyl, etc., and where the alkyl group contains three or more carbon atoms we mean to include straight or branched chain groups provided that the carbon alpha to the phenylene group is primary or secondary. We prefer that the alkyl group contains from one to 10 carbon atoms. Preferred alkyl groups include for example, methyl, ethyl, isopropyl, isobutyl, sec-butyl, 1-methylbutyl, 2-methylbutyl, neopentyl, 1-methylpentyl, 1-ethylpentyl, 2-ethylpentyl, 2,2-dimethylpentyl, 2-ethylpentyl, 2,2-diethylpentyl, 1-methylhexyl, 1-ethylhexyl, 2-methylhexyl, 2,2-dimethylhexyl, 2-ethylhexyl, 2-ethyl-2-methylhexyl, etc.

The aralkyl in Formula II includes both aralkyl and substituted aralkyl wherein the carbon alpha to the phenylene group is primary or secondary. Suitable aralkyl groups include but are not limited to benzyl and styryl. Appropriate substituted aralkyl groups include, for example, chlorobenzyl, bromobenzyl, iodobenzyl, fluorobenzyl, methoxybenzyl, ethoxybenzyl, methylbenzyl, ethylbenzyl, or tertbutylbenzyl. We prefer that the aralkyl group contains less than 20 carbon atoms. Where the alkylene portion of the aralkyl group contains two or more carbons, the alkylene group may be straight or branched chain. We prefer that when the aralkyl group is substituted that it be with a group which is halo, alkoxy, or alkyl. Any substitution is on the aryl portion of the aralkyl group and may be made for one or all of the available hydrogens. Suitable halo groups include chloro, bromo, iodo, and fluoro. Suitable alkoxy and alkyl groups include those containing from one to 13 carbon atoms.

Exemplary polyphenylene ethers include the following: poly(2,6-dimethyl-1,4-phenylene)ether; poly(2,6-diethyl-1,4-phenylene)ether; poly(2,6-diisopropyl-1,4-phenylene)ether; poly(2,6-diisobutyl-1,4-phenylene)ether; poly(2,6-di-sec-butyl-1,4-phenylene)ether; poly[2,6-di(1'-methylbutyl)-1,4-phenylene]ether; poly[2,6-di(2'-methylbutyl)-1,4-phenylene]ether; poly(2,6-di-neopentyl-1,4-phenylene)ether; poly[2,6-di(1'-methylpentyl)-1,4-phenylene]ether; poly[2,6-di(1'-ethylpentyl)-1,4-phenylene]ether; poly[2,6-di(2'-methyl-pentyl)-1,4-phenylene]ether; poly[2,6-di(2',2'-dimethyl-pentyl)-1,4-phenylene]ether; poly[2,6-di(2'-ethylpentyl)-1,4-phenylene]ether; poly[2,6-di(2',2'-diethylpentyl)-1,4-phenylene]ether; poly[2,6-di(1'-methylhexyl)-1,4-phenylene]ether; poly[2,6-di(1'-ethylhexyl)-1,4-phenylene]-ether; poly[2,6-di(2'-methylhexyl)-1,4-phenylene]ether; poly[2,6-di(2',2'-dimethylhexyl)-1,4-phenylene]ether; poly-[2,6-di(2'-ethylhexyl)-1,4-phenylene]ether; poly[2,6-di(2'-ethyl-2'-methylhexyl)-1,4-phenylene]ether; poly(2-methyl-6-isopropyl-1,4-phenylene)ether; poly(2-methyl-6-sec-butyl-1,4-phenylene)ether; poly(2,6-distyryl-1,4-phenylene)ether; poly(2,6-dibenzyl-1,4-phenylene)ether; poly[2,6-di(4'-chlorobenzyl)-1,4-phenylene]ether; poly[2,6-di(4'-bromo-benzyl)-1,4-phenylene]ether; poly[2,6-di(4'-iodobenzyl)-1,4-phenylene]ether; poly[2,6-di(4'-fluorobenzyl)-1,4-phenylene]-ether; poly[2,6-di(4'-methoxybenzyl)-1,4-phenylene]ether; poly[2,6-di(4'-ethoxybenzyl)-1,4-phenylene]ether; poly[2,6-di(4'-methylbenzyl)-1,4-phenylene]ether; poly[2,6-di(4'-ethylbenzyl)-1,4-phenylene]ether; poly[2,6-di(4'-tert-butylbenzyl)-1,4-phenylene]ether.

Exemplary block polyphenylene ethers include the following: copolymers of phenol and 2,6-dimethylphenol wherein the terminal phenolic group is 2,6-dimethylphenol; copolymers of 2,6-dimethylphenol and 2,6-diisopropylphenol; copolymers of 2-isopropylphenol and 2,6-diisopropylphenol wherein the terminal phenolic group is 2,6-diisopropylphenol.

Very favorable results have been obtained wherein $R_1$, $R_2$, and $R_3$ are primary alkyl wherein there is at least one alkyl branch on the carbon beta to the phenylene group. Examples of these preferred polyphenylene ethers include the following: poly(2,6-diisobutyl-1,4-phenylene)ether; poly[2,6-di(2'-methylbutyl)-1,4-phenylene]ether; poly[2,6-di(2'-ethylbutyl)-1,4-phenylene]ether; poly[2,6-di(2'-ethylhexyl)-1,4-phenylene]ether.

The polyphenylene ethers useful in this invention may be obtained by the method disclosed in U.S. Pat. No. 3,306,875 or by the method of Example I. The block polyphenylene ethers are prepared by step copolymerization of the phenols. The molecular weight of the polyphenylene ether may vary within wide limits. In general, polymers wherein $n + p$ in Formula II is an integer between 2 and 100 can be used; however, polymers wherein $n + p$ is an integer between 2 to 50 carbon atoms are preferred.

Suitable phenols for use in preparing the polyphenylene ethers include those of the formula:

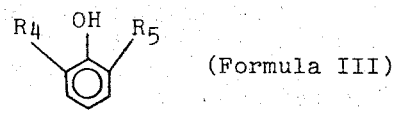

(Formula III)

wherein $R_4$ and $R_5$ are consistent with $R_1$, $R_2$, and $R_3$ in Formula II. All of the suitable phenols are commercially available or prepared by known techniques.

The term "rubber" as used herein means those polymeric elastomers such as natural and synthetic rubber. These materials are stabilized against hardening, cracking, and checking with the described polyphenylene ethers. Exemplary of natural rubber is *Hevea brasiliensis*, while synthetic rubbers include high molecular weight unsaturated hydrocarbon polymers such as polystyrene-butadiene rubber; polybutadiene rubber; polyisoprene rubber; polyneoprene rubber; polybutyl rubber; polynitrile-butadiene rubbers; polyacrylonitrile-butadiene-styrene rubbers; acrylate-butadiene rubbers; styrene-butadiene-styrene block copolymeric rubbers; and styrene-butadiene-acrylonitrile block copolymeric rubbers.

In general, the polyphenylene ethers of Formula II should be used with the rubber to be stabilized in an amount effective and sufficient to stabilize the material. The requisite amount will, of course, depend both on the efficiency of the particular polyphenylene ether, and on the nature of the rubber in which it is employed. It has been our experience that from 0.01 percent to 10 percent by weight based on the weight of the rubber is sufficient.

It is to be understood that the stabilizing effect of the polyphenylene ethers is considerably enhanced by conventional synergists such as certain sulfides and polysulfides. The synergist is used in conventional amounts. For example, an amount of synergist from about 0.1 percent to about 1 percent by weight of the rubber to be stabilized is satisfactory but we prefer to use from 0.1 percent to 0.5 percent by weight.

As sulfides there may be mentioned dialkylsulfides, particularly wherein the alkyl groups are long chain such as dodecyl groups since the lower dialkylsulfides are too volatile to be effective, di(substituted) alkylsulfides particularly esters of bis-carboxyalkyl sulfides such as dilauryl, distearyl, ditridecyl, or dioctadecyl thiodipropionates or thiodibutyrates, dibenzylsulfides such as bis(2-hydroxy-5-methylbenzyl) sulfide and bis-(3-tert-butyl-2-hydroxy-5-methoxybenzyl)sulfide, diaryl sulfide, and sulfides such as diphenyl sulfide, dicresyl sulfide, 2:2'-dihydroxy-5:5'-dimethyl di-phenyl, diphenyldisulfide.

It will further be understood that the rubber in addition to containing a stabilizing amount of polyphenylene ether and a synergist may contain such other ingredients as other antioxidants, coloring agents, fillers, curing agents, etc.

DESCRIPTION OF THE PREFERRED EMBODIMENTS

The following embodiments of this invention are shown for the purpose of illustrating the invention and demonstrate the best mode for practicing the invention. It will be apparent to those skilled in the art that various changes and modifications may be made therein without departing from the spirit and scope of the invention as it is more precisely defined in the subjoined claims.

EXAMPLE 1

In a 1,000-ml flask, 33.3 g of 2,6-di(2-ethylhexyl)-phenol was placed. Sodium hydroxide pellets, 8.0 g were dissolved in 250 ml of methanol and then added to the 2,6-di(2-ethylhexyl)phenol in the flask. The methanol was almost completely evaporated from the flask and then 900 ml of benzene was added. Air was bubbled through the stirred admixture for 23 hours.

The benzene was extracted from the reaction mixture with 500 ml of water and then was stripped to yield 31.8 g of oily residue.

Methylene dichloride, 150 ml, was added to the residue. Then the methylene chloride solution was added to a mixture of 6 ml of hydrochloric acid in 600 ml of methanol. The solution was then decanted. The polymeric residue was redissolved in a mixture of methylene dichloride and reprecipitated by slowly pouring into a solution of hydrochloric acid and methanol and again separated by decantation. The polymeric residue was dried and found on analysis to be poly [2,6-di(2'-ethylhexyl)phenylene]ether having a number-average molecular weight of 1300 as determined by vapor pressure osmometry.

EXAMPLE 2

Using the method of Example 1, but substituting 2,6-di(2'-methylbutyl)phenol for the 2,6-di(2'-ethylhexyl) phenol, poly[2,6-di(2'-methylbutyl)phenylene]ether having a number-average molecular weight of 1500 was prepared.

EXAMPLE 3

Again using the method of Example 1 but substituting 2,6-diisobutylphenol for the 2,6-di(2'-ethylhexyl)phenol, poly(2,6-diisobutylphenylene)ether having a number-average molecular weight of 1700 was prepared.

EXAMPLE 4

A number of candidate antioxidants were evaluated in cis-polyisoprene. The results of these tests are set forth in Table I. Cis-polyisoprene was cut up into small pieces and dissolved overnight in a rapidly stirred solution of 500 ml of toluene. Since the candidate antioxidants were readily soluble in toluene, 0.10 g was then added to the cis-polyisoprene toluene solution and stirred until it dissolved. A sample of the solution was then taken up in a capillary dropper and 15 drops were placed on a circular sodium chloride plate, 1 inch in diameter. The plate was then put in a 130°C. oven for a few minutes to evaporate the toluene.

An infrared spectrum was run of the film on the plate. The plate was then put back in the oven. Every hour it was removed and another infrared spectrum was run. This procedure was repeated until appreciable oxidation had taken place as indicated by the appearance of a carbonyl band at 1,700–1,750 cm$^{-1}$. The test was ended when the carbonyl band exceded 6 cm on a Perkin Elmer Infrared Spectrophotometer, Model 710. This length is approximately equal to the length of the peak at 1,450 cm$^{-1}$.

TABLE I

| Test No. | | Hours Maximum Protection |
|---|---|---|
| 1 | Blank | 0.5 |
| 2 | 2,6-di-tert-butyl-p-cresol | 0.5 |
| 4 | poly[2,6-di(2'-methylbutyl) phenylene]ether (2) | 1 |
| 3 | poly[2,6-di(2'-ethylhexyl) phenylene]ether (1) | 3 |
| 5 | poly(2,6-diisobutylphenylene) ether (3) | 2 |

(1) prepared in Example 1
(2) prepared in Example 2
(3) prepared in Example 3

EXAMPLE 5

Poly[2,6-di(2'-ethylhexyl)phenylene]ether from Example 1 and 2,6-di-tert-butyl-p-cresol were evaluated in this example as antioxidants for turbine oil. A modification of ASTM D943-IP157 was used. The following modifications were made: 15 inches of electrolylic copper wire No. 14 Brown and Sharpe gage and 15 inches of low-metalloid steel wire No. 16 Washburn and Moen gage were used to wind the mandrel; 150 ml of a commercial oil sold by American Oil Company was used; oil temperature was held at 150°C. during the test; and the air flow rate was adjusted to 3 liters per hour.

In Test 6, 0.60 g of 2,6-di-tert-butyl-p-cresol was added to the oil. Every 24 hours a 5–10 g sample of oil was removed from the oil tube. The acid number (mg sample /g KOH) of the sample was determined and the time required to reach an acid number of 2.0 was determined. In this test it took 7 days for the acid number to reach 2.0.

Following the above procedure in Test 7 the effectiveness of poly[2,6-di(2'-ethylhexyl)phenylene]ether in place of the 2,6-di-tert-butyl-p-cresol as a stabilizer for turbine oil was determined. In this test it took 2 days for the acid number of the oil to reach 2.0.

The above examples clearly demonstrate the accomplishment of this invention. Examples 1–3 inclusive demonstrate our preferred method for obtaining the polyphenylene ethers useful in our invention.

In Example 4 a comparison of Tests 3–5 inclusive with Test 2 clearly demonstrates the unexpected superiority of polyphenylene ethers of Formula II as antioxidants in cis-polyisoprene over the conventional antioxidant 2,6-di-tert-butyl-p-cresol.

In Example 5 a comparison of Test 6 with Test 7 shows that polyphenylene ethers of Formula II do not distinguish themselves as antioxidants in turbine oils in comparison with 2,6-di-tert-butyl-p-cresol. Neither Test 6 nor Test 7 are embodiments of our invention but were prepared to compare with the results of Example 4. The excellent ability of polyphenylene ethers to stabilize rubbers in Example 4 as compared to that of 2,6-di-tert-butyl-p-cresol is unexpected in view of their lackluster performance in Example 5 in turbine oil.

From the foregoing description we consider it to be clear that the present invention contributes a substantial benefit to the antioxidant art by providing a new and useful antioxidant for rubbers.

We claim:

1. An elastomeric rubber selected from natural rubber and unsaturated hydrocarbon polymer synthetic rubber stabilized with a polyphenylene ether having the following structural formula:

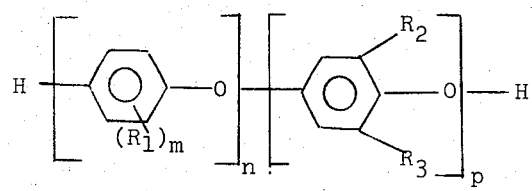

wherein $R_1$ is hydrogen, primary alkyl, or secondary alkyl; $R_2$ and $R_3$ are primary alkyl, secondary alkyl, primary aralkyl, or secondary aralkyl; m is an integer between 1 and 2 inclusive; and the sum of $n + p$ is an integer between 2 and 50 inclusive with the further condition that p is never 0, said polyphenylene ether being present in an amount between 0.01 and 10 percent based on the weight of the rubber.

2. The composition of claim 1 wherein the sum of $n + p$ in the formula is an integer between 2 and 50 inclusive.

3. The composition of claim 1 wherein a dialkyl sulfide is present as a synergist in an amount from 0.1 percent to 1 percent by weight based on the weight of the rubber, and wherein the respective alkyl groups in said dialkyl sulfide are long chain having at least 12 carbon atoms.

4. The composition of claim 3 when $R_1$, $R_2$, and $R_3$ are primary alkyl or secondary alkyl and said primary alkyl or said secondary alkyl group contains from one to 10 carbon atoms.

5. The composition of claim 3 wherein $R_1$, $R_2$, and $R_3$ are primary aralkyl or secondary aralkyl and said primary aralkyl group or said secondary aralkyl group contains less than 20 carbon atoms.

6. The composition of claim 3 wherein $R_1$, $R_2$, and $R_3$ are primary alkyl and there is at least one alkyl branch in the primary alkyl group on the carbon beta to the phenylene group.

7. The composition of claim 3 wherein the rubber is natural rubber.

8. The composition of claim 3 wherein the rubber is cis-polyisoprene.

9. The composition of claim 3 wherein the rubber is polyacrylonitrile-butadiene-styrene.

10. The composition of claim 3 wherein the rubber is polystyrene-butadiene.

11. The composition of claim 3 wherein the rubber is polybutadiene-acrylonitrile.

12. The composition of claim 3 wherein the polyphenylene ether is poly(2,6-di-isobutyl-1,4-phenylene)ether.

13. The composition of claim 3 wherein the polyphenylene ether is poly[2,6-di(2'-methylbutyl)-1,4-phenylene]ether.

14. The composition of claim 3 wherein the polyphenylene ether is poly[2,6-di(2'-ethylbutyl)-1,4-phenylene]ether.

15. The composition of claim 3 wherein the polyphenylene ether is poly[2,6-di(2'-ethylhexyl)-1,4-phenylene]ether.

* * * * *